United States Patent [19]
Platzke et al.

[11] 3,783,158
[45] Jan. 1, 1974

[54] PROCESS FOR RECOVERING VOLATILIZED METAL OXIDES FROM GAS STREAMS

[75] Inventors: Ronald N. Platzke; Henry Rush Spedden, both of Salt Lake City, Utah

[73] Assignee: Kennecott Copper Corporation, New York, N.Y.

[22] Filed: Dec. 27, 1971

[21] Appl. No.: 212,462

[52] U.S. Cl.................. 423/49, 423/210, 423/112, 423/107, 423/99, 423/89, 423/508, 55/72
[51] Int. Cl............................................. C01g 47/00
[58] Field of Search...................... 423/49, 50, 210, 423/605, 606; 55/72

[56] References Cited
UNITED STATES PATENTS

| | | | |
|---|---|---|---|
| 3,244,475 | 4/1966 | Churchward | 423/49 |
| 3,495,934 | 2/1970 | Ziegenbalg et al. | 423/605 X |
| 2,809,092 | 10/1957 | Zimmerley et al. | 423/606 X |
| 2,972,531 | 2/1961 | Zimmerley et al. | 423/50 |
| 3,348,942 | 10/1967 | Davenport | 423/49 |

Primary Examiner—Herbert T. Carter
Attorney—Philip A. Mallinckrodt et al.

[57] ABSTRACT

Certain organic compounds in solution other than aqueous are used to directly recover oxides of metals that form anionic species therewith, from gas streams carrying such metal oxides in volatilized form. The organic compounds are selected from the group consisting of organic phosphates and those alcohols and water-insoluble amines which have carbon chains made up of a minimum of four carbon stoms. The tertiary amines and tributyl phosphate are especially effective. Although the process is particularly applicable to rhenium, other typical metals are selenium, lead, zinc, and gallium. One or more of such organic compounds is dissolved in a suitable organic vehicle, such as kerosene, and the resulting organic solution is brought into intimate contact with the gas stream. The resulting solution pregnant with the metal oxide values is treated, as by solvent extraction procedures, for the recovery of such metal values.

10 Claims, 1 Drawing Figure

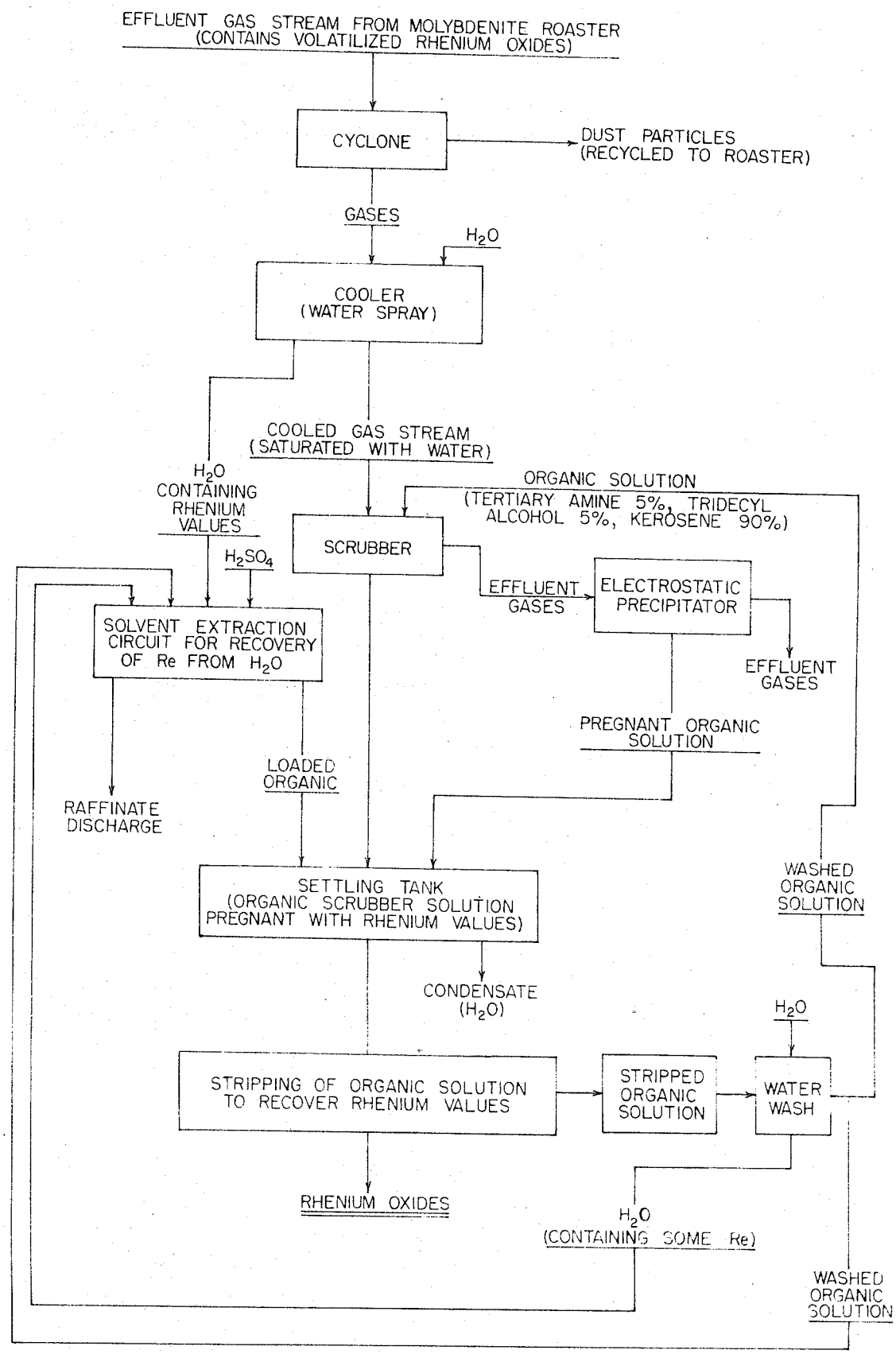

PROCESS FOR RECOVERING VOLATILIZED METAL OXIDES FROM GAS STREAMS

BACKGROUND OF THE INVENTION

Field: This invention relates to the recovery of volatilized metal oxides from gas streams.

State of the Art: It is known that rhenium oxides can be directly recovered from a stream of effluent gases given off during the roasting of molybdenite concentrates containing rhenium, by scrubbing the gas stream with water or weak caustic or acid aqueous solutions (see Zimmerley et al. U.S. Pat. No. 2,809,092). It is also known that quarternary amines can be employed for the transfer of rhenium values from an aqueous to an organic solution in a liquid-liquid solvent extraction process (see Churchward U.S. Pat. No. 3,244,475).

SUMMARY OF THE INVENTION

The present process differs from the known art by utilizing substantially water-insoluble amines in general, i.e. primary, secondary, tertiary, and quaternary amines, as well as alcohols, having carbon chains made up of a minimum of four carbon atoms, and the organic phosphates, dissolved either alone or in combination in a suitable organic vehicle, such as kerosene, for directly contacting and dissolving vaporized oxides of metals that form anionic species therewith. Thus, the invention comprises the direct dissolving of gaseous metal oxides in an organic solvent, as against the old practice of first dissolving such gaseous metal oxides in an aqueous solvent therefor and then extracting the dissolved metal values from such aqueous solvent by a liquid-liquid solvent extraction procedure.

A primary source of volatilized metal oxides adapted for recovery by this invention are the effluent gases that emanate from the heat treatment of various materials, such as ores and ore concentrates. The invention is particularly advantageous in its application to molybdenum sulfides that are being roasted for the production of molybdic oxide, but may be similarly applied to effluent gases from the roasting of copper, zinc, and lead sulfides, to reverberatory gases, etc. The treatment of such effluent gases in accordance with the invention can be conveniently carried out in a conventional scrubbing tower in which the temperature of the gas stream is first lowered by exposure to a water spray, the gases thereby becoming saturated with water. The cooled and water-saturated gases are contacted by a fine spray of the organic reagent, which effectively dissolves soluble metal oxides and removes them from the gas stream. The organic reagent will usually be dissolved in an organic vehicle, such as kerosene, and may contain an organic modifier, such as an alcohol. Contact can be accomplished in other ways, as in a tray scrubber wherein the gas is passed through a body of the liquid. In order to ensure that all of the tiny droplets of the organic solution containing the dissolved metal oxides are removed from the gas stream, the effluent gases are preferably subjected to conventional wet electrostatic precipitation procedures.

Many metals, e.g. rhenium, selenium, lead, zinc, gallium, indium, vanadium, volatilize under conditions of high temperature, forming gaseous oxides that are dissolved and recovered in accordance with this invention.

THE DRAWING

In the accompanying drawing, the single FIGURE is a generalized flowsheet showing the process as specifically applied to volatilized rhenium oxides contained in the effluent gases emanating from the roasting of molybdenite ore concentrates. The particular procedures employed represent the best mode presently contemplated of carrying out the invention from a generalized standpoint.

DETAILED DESCRIPTION OF THE ILLUSTRATED PROCEDURE

As illustrated in the accompanying flowsheet, rhenium-oxide-bearing effluent gases from the roasting of molybdenite ore concentrates are first fed into a conventional cyclone to remove dust particles, and are then cooled with a fine spray of water to remove further amounts of fine dust particles and to lower the temperature of the gas stream. During the cooling step, some of the rhenium oxides are dissolved from the gas stream and the gases become saturated with water.

The cooled, water-saturated gases are passed into a conventional gas scrubber, which effects intimate contact between such gases and a non-aqueous solution of the organic reagent or reagents.

The scrubber solution, pregnant with rhenium oxide values, is passed to a settling tank for the separation of condensed $H_2O$ and then to a treatment stage for the recovery of its contained values. Any suitable treatment may be employed, but it is advantageous to utilize standard chemical stripping procedures, as indicated, considering the organic nature of the pregnant solution. Thus, if a tertiary amine is employed as the organic, as base such as ammonium hydroxide or sodium hydroxide can be used for stripping purposes. If the organic is a quaternary amine, a reagent such as ammonium thiocyanate or perchloric acid can be utilized for stripping purposes. If alcohol alone is used as the organic, any suitable stripping agent such as a thiocyanate can be employed.

It has been found that the effluent gases from the scrubber contain minute droplets of pregnant solution that can be removed by passing the gas stream through an electrostatic precipitator. The pregnant organic solution so collected is advantageously run into the main body of pregnant organic solution from the scrubber before such solution is treated for the removal of its contained rhenium values.

The water used for cooling purposes contains some absorbed rhenium values and is advantageously run through a solvent extraction circuit, as indicated, the loaded solvent therefrom being sent to the stripping stage.

In the illustrated instance, the scrubber solution is a mixture of a tertiary amine and alcohol in kerosene as a vehicle, both the amine and the alcohol having carbon chains of at least four carbon atoms. As indicated, the alcohol may be tridecyl and is used here primarily as a modifier. The proportions may be 5 percent amine, 5 percent alcohol, and 90 percent kerosene. This has been found to be an advantageous mixture for the organic scrubber solution, but laboratory tests have shown that other water-insoluble amines and alcohols having carbon chains of at least four carbon atoms can be used alone or together in a suitable vehicle, as can also organic phosphates, e.g. tributyl phosphate which has been found to be particularly effective.

We have found that amines having a minimum of four carbon atoms in the carbon chain are sufficiently nonvolatile and insoluble in water to effectively remove volatilized metal oxides directly from the water-saturated gas stream. Although the higher-chain amines are more expensive and therefore less economical to use, it has been found that amines having carbon chain lengths of from eight to 14 carbon atoms are economical and efficient in their removal of volatilized metal oxides from gases. Typical of the organic phosphates which can be used in the process are tributyl phosphate and dodecyl phosphoric acid.

In actual practice, the organic solution indicated is recycled through the scrubber until it is loaded to a level of about 0.8 grams of rhenium per liter, and is then stripped with a 10 percent solution of ammonium hydroxide. The ammonium hydroxide stripping solution can be loaded through repeated recyclings to a level of about 15 grams of rhenium per liter.

The stripped organic solution is washed with water, and part is recycled to the scrubber and part to the solvent extraction circuit. The water wash, which contains as much as 0.5 grams rhenium per liter, is acidified with sulfuric acid to pH 1.0 before being sent to, or after it has reached the solvent extraction circuit. The water used for cooling purposes, which absorbs some rhenium values, is also advantageously passed to the solvent extraction circuit.

The following is a typical example of the process of the invention.

EXAMPLE

Approximately 200 gallons of an organic solution containing by volume 5 percent Adogen 383 (a tertiary amine), 5 percent tridecyl alcohol, and 90 percent kerosene, pregnant with rhenium oxides removed from the effluent gas stream of a conventional molybdenite roaster by scrubbing was treated in a laboratory solvent extraction unit using ammonium hydroxide as the stripping solution. The concentration of the organic feed solution was 0.114 grams of rhenium per liter. The stripped organic solution was washed with water and recycled to the scrubber. The ammonium hydroxide stripped solution was found to contain approximately 15 grams of rhenium per liter. It was heated to remove excess water and to crystalize ammonium perrhenate, which was filtered from the solution.

Whereas this invention is illustrated and described herein with respect to certain preferred procedures, it is to be understood that many variations are possible without departing from the inventive concepts particularly pointed out in the claims.

We claim:

1. A process for recovering volatilized rhenium oxides from gas streams containing same, comprising contacting such a gas stream with a non-aqueous solution containing an organic solvent extraction reagent for the rhenium oxide in said stream, said reagent being selected from the group consisting of organic phosphates and of those alcohols and those primary, secondary, tertiary, and quaternary amines that have at least four carbon atoms in their carbon chains and mixtures thereof so as to remove said rhenium oxide from the gas stream; and treating the resulting solution to recover said rhenium values therefrom.

2. A process as set forth in claim 1, wherein the gas stream is made up of effluent gases from the roasting of molybdenite.

3. A process as set forth in claim 2, wherein the non-aqueous solution comprises a mixture of approximately 90 percent kerosene, 5 percent alcohol, and 5 percent tertiary amine, both the alcohol and the amine having carbon chains of at least four carbon atoms.

4. A process as set forth in claim 3, wherein the contact between the gas and the organic solution is carried out by scrubbing the gas stream with said solution.

5. A process as set forth in claim 4, wherein the gas stream is first contacted with a water spray to cool the gas and to saturate it with water.

6. A process as set forth in claim 1, wherein the organic solvent extraction reagent is selected from the group consisting of tri-butyl phosphate and dodecyl phosphoric acid.

7. A process as set forth in claim 1, wherein the organic solvent extraction reagent is a tertiary amine having a carbon chain length in the range between eight and fourteen carbon atoms.

8. A process as set forth in claim 1, wherein the gas stream is first contacted with a water spray to cool the gas and to saturate it with water.

9. A process as set forth in claim 8, wherein the solution containing the dissolved rhenium values is treated by chemically stripping the said values therefrom; the stripped organic solution is washed with water; the wash water and the residual coolant water are passed to a solvent extraction stage for recovery of absorbed rhenium values; and the value-loaded solvent from the solvent extraction stage is passed to the stripping stage.

10. A process as set forth in claim 9, wherein part of the stripped and washed organic solution is recycled to the gas-contact stage and part is recycled to the solvent extraction stage.

* * * * *